United States Patent
Park

(10) Patent No.: US 10,528,393 B2
(45) Date of Patent: Jan. 7, 2020

(54) DATA STORAGE DEVICE WITH WEIGHTING TO CONTROL COMMAND SELECTION AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/701,854

(22) Filed: Sep. 12, 2017

(65) Prior Publication Data

US 2018/0225151 A1 Aug. 9, 2018

(30) Foreign Application Priority Data

Feb. 9, 2017 (KR) .................. 10-2017-0018102

(51) Int. Cl.
*G06F 9/50* (2006.01)
*G06F 3/06* (2006.01)

(52) U.S. Cl.
CPC .......... *G06F 9/5038* (2013.01); *G06F 3/0611* (2013.01); *G06F 3/0659* (2013.01); *G06F 3/0676* (2013.01); *G06F 3/0679* (2013.01); *G06F 3/0688* (2013.01); *G06F 3/0656* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,170,042 B1 * | 1/2001 | Gaertner | ............... | G06F 3/0613 710/39 |
| 7,574,538 B1 * | 8/2009 | Yochai | .................. | G06F 3/0613 710/36 |
| 9,715,465 B2 * | 7/2017 | Kim | .................... | G06F 13/1642 |
| 9,927,983 B2 * | 3/2018 | Benisty | .................... | G06F 3/061 |
| 2008/0104283 A1 * | 5/2008 | Shin | ....................... | G06F 3/0611 710/6 |
| 2013/0262762 A1 | 10/2013 | Igashira et al. | | |
| 2014/0195699 A1 * | 7/2014 | Sokol, Jr. | ................. | G06F 13/18 710/40 |
| 2015/0254022 A1 * | 9/2015 | Oikawa | .................. | G06F 3/0659 711/103 |

* cited by examiner

*Primary Examiner* — Raymond N Phan
(74) *Attorney, Agent, or Firm* — IP & T Group LLP

(57) ABSTRACT

A method for operating a data storage device includes determining a first weight based on the sum of data sizes for commands queued in a command queue; determining a second weight by summing weights by types of the commands; and controlling an urgent command selection threshold value for selecting an urgent command existing in the command queue, based on at least one of the first weight and the second weight.

16 Claims, 10 Drawing Sheets

DATA STORAGE DEVICE WITH WEIGHTING TO CONTROL COMMAND SELECTION AND OPERATING METHOD THEREOF

CROSS-REFERENCES TO RELATED APPLICATION

The present application claims priority under 35 U.S.C. § 119(a) to Korean application number 10-2017-0018102, filed on Feb. 9, 2017. In the Korean Intellectual Property Office, which is incorporated herein by reference in its entirety.

BACKGROUND

1. Technical Field

Various embodiments generally relate to a semiconductor device, and, more particularly, to a data storage device and an operating method thereof.

2. Related Art

Recently, the paradigm for the computer environment has been changed into ubiquitous computing so that computer systems can be used anytime and anywhere. Due to this fact, the use of portable electronic devices such as mobile phones, digital cameras, and notebook computers has rapidly increased. In general, portable electronic devices use a data storage device or a memory system which uses a memory device for storing data. A data storage device may be used to store data to be used in a portable electronic device.

A data storage device using a memory device has excellent stability and durability because it does not include a mechanical driving unit. Also, a data storage device using a memory device is advantageous in that it may access data faster and consume less power. Non-limiting examples of a data storage device having such advantages include a universal serial bus (USB) memory device, a memory card having various interfaces, a universal flash storage (UFS) device, and a solid-state drive (SSD).

SUMMARY

Various embodiments of the present invention are directed to a data storage device that is capable of processing a command with a low priority within a timeout, and an operating method thereof.

In an embodiment, a data storage device may include: a nonvolatile memory device; a command queue suitable for queuing commands received from a host device; and a processor suitable for determining a first weight by summing data sizes for the commands queued in the command queue, determining a second weight by summing weights by types of the commands, and controlling an urgent command selection threshold value for selecting an urgent command existing in the command queue, based on at least one of the first weight and the second weight.

In an embodiment, a method for operating a data storage device may include: determining a first weight based on a data size sum; determining a second weight by summing weights by types of the commands; and controlling an urgent command selection threshold value for selecting an urgent command existing in the command queue, based on at least one of the first weight and the second weight.

According to embodiments of the present invention, it is possible to control in real time a checkpoint for selecting and processing first an urgent command existing in a command queue, depending on whether a latency occurs.

As a consequence, it is possible to prevent occurrence of timeouts for commands of low priorities stood by in the command queue.

DETAILED DESCRIPTION

Figure 1:
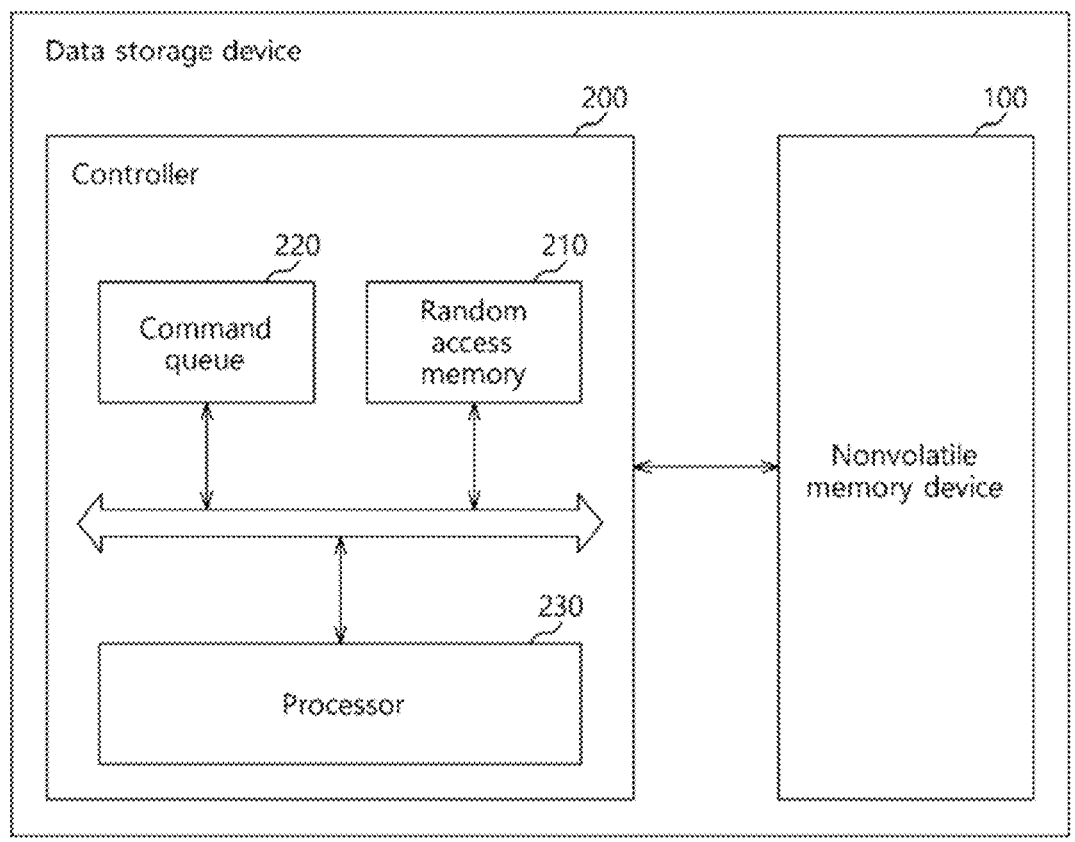
FIG. 1 is a block diagram illustrating a data storage device in accordance with an embodiment of the present disclosure.

Hereinafter, a data storage device and an operating method thereof will be described below with reference to the accompanying drawings through various examples of embodiments. The present disclosure, however, may be embodied in various different forms, and should not be construed as being limited to the illustrated embodiments herein. Rather, these embodiments are provided as examples so that this disclosure will be thorough and complete, and will fully convey the various aspects and features of the present invention to those skilled in the art to which the present invention pertains.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, b, and C.

Spatially relative terms, such as "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in manufacturing, use or operation in addition to the orientation depicted in the figures. For example, if the device in the figures is turned over, elements described as "below" or "under" other elements or features would then be "above" the other elements or features. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached to drawings.

FIG. 1 is a block diagram illustrating a data storage device 10 in accordance with an embodiment.

Referring to FIG. 1, the data storage device 10 may store data to be accessed by a host device (not shown) such as a mobile phone, an MP3 player, a laptop computer, a desktop computer, a game player, a television (TV), an in-vehicle infotainment system, and so forth. The data storage device 10 may also be referred to as a memory system.

The data storage device 10 may be implemented with any one of various kinds of storage devices according to the protocol of an interface which is electrically coupled with the host device. For example, the data storage device 10 may be implemented with any one of various kinds of storage devices such as a solid-state drive (SSD), a multimedia card such as an MMC, an eMMC, an RS-MMC and a micro-MMC, a secure digital card such as an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-e) card type storage device, a compact flash (CF) card, a smart media card, a memory stick, and so forth.

The data storage device 10 may be implemented with any one among various kinds of package types. For example, the data storage device 10 may be implemented with any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory device 100 and a controller 200.

The nonvolatile memory device 100 may operate as the storage medium of the data storage device 10. The nonvolatile memory device 100 may be implemented with any one of various types of nonvolatile memory devices such as a NAND flash memory device, a NOR flash memory device, a ferroelectric random-access memory (FRAM) using a ferroelectric capacitor, a magnetic random-access memory (MRAM) using a tunneling magneto-resistive (TMR) layer, a phase change random-access memory (PRAM) using a chalcogenide alloy, and a resistive random-access memory (RRAM or ReRAM) using a transition metal compound, according to memory cells.

While FIG. 1 illustrates that the data storage device 10 includes one nonvolatile memory device 100, this is only an example, and the data storage device 10 may include a plurality of nonvolatile memory devices. The embodiment may be applied in the same manner to a data storage device including a plurality of nonvolatile memory devices.

The nonvolatile memory device 100 may include a memory cell array (not shown) which has a plurality of memory cells respectively disposed at regions where a plurality of bit lines (not shown) and a plurality of word lines (not shown) intersect with each other.

The nonvolatile memory device 100 may include a plurality of memory blocks (not shown), and each memory block may include a plurality of pages.

The controller 200 may control the various operations of the data storage device 10 through driving of a firmware or a software loaded in a random-access memory 210. The controller 200 may decode and drive a code type instruction or algorithm such as a firmware or a software. The controller 200 may be embodied in the form of a hardware or in the combined form of a hardware and a software.

The controller 200 may include the random-access memory 210, a command queue 220, and a processor 230. While not shown in FIG. 1, the controller 200 may further include a host interface unit which interfaces the host device with the data storage device 10 in correspondence to the protocol of the host device. For example, the host interface unit may communicate with the host device through any one of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-e) protocols.

Also, the controller 200 may further include a memory control unit (not shown) which is configured to control the operation of the nonvolatile memory device 100 according to control of the processor 230. The memory control unit may also be referred to as a memory interface unit.

The random access memory 210 may store a firmware or a software to be driven by the processor 230. Further, the random-access memory 210 may be configured to store data necessary for driving the firmware or the software. That is to say, the random-access memory 210 may operate as a working memory of the processor 230.

The random access memory 210 may be configured to temporarily store data to be transmitted from the host device to the nonvolatile memory device 100 or data to be transmitted from the nonvolatile memory device 100 to the host device. In other words, the random-access memory 210 may operate as a buffer memory.

The command queue 220 may include a storage space capable of queuing the commands received from the host device, in a sequence in which they are received. The command queue 220 may have a first-in first-out (FIFO) structure, and the commands queued in the command queue 220 may be outputted sequentially starting from a command which is queued first, by the processor 230.

The commands received from the host device may have different priorities. Namely, among the commands received from the host device, there may exist commands which should be processed earlier than the other commands to improve the performance of the data storage device 10. A command's priority relates to the order at which the received command is to be processed relatively to other commands in the queue, and a command having a relatively higher priority may be processed earlier than a command having a relatively lower priority.

Therefore, a command having a relatively lower priority may stand by in a state in which it is queued in the command queue 220, until its turn to be processed comes, i.e., until commands having relatively higher priority have been processed. However, if commands having priorities higher than the corresponding command are received successively from the host device, as a standby time of the corresponding command increases indefinitely, the relatively lower priority command may not be processed within a timeout. The timeout may mean a predetermined executable time for the command. Specifically, the timeout may be a time from when the command is received from the host device to when the command becomes executable in the nonvolatile memory device 100. The present embodiment is directed to a method in which a command which is in stand-by in the command queue 220 and which has a relatively lower priority may be processed within a timeout in any case.

The processor 230 may control the various operations of the controller 200. In some embodiments, the processor 230 may fetch a queued command from the command queue 220, analyze and then process the fetched command. For example, if a fetched command is a read command, the processor 230 may read out data from the nonvolatile memory device 100 based on a logical address which is received together with the read command from the host device, and may transmit the read data to the host device. Also, if a fetched command is a write command, the processor 230 may store write data in the nonvolatile memory device 100 based on a logical address which is received together with the write command from the host device.

To this end, the processor 230 may decode and drive firmware data loaded in the random-access memory 210. The processor 230 may be embodied in the form of a hardware or in the combined form of a hardware and a software.

While the processor 230 may fetch and process sequentially the commands queued in the command queue 220 in a sequence in which they are queued, in the case where the priorities of the commands queued in the command queue 220 are different from one another, a command having a relatively higher priority may be fetched and processed earlier than a command having a relatively lower priority.

The processor 230 may check whether an urgent command exists among the commands queued in the command queue 220, each time a predetermined command queue checkpoint is reached, and may process first the urgent command regardless of the priorities of the other commands when the urgent command exists.

The command queue checkpoint may correspond to a point of time when the number of the commands queued in the command queue 220 (hereinafter, referred to as 'the number of commands') becomes greater than a threshold number, hereinafter, referred to as a 'first threshold value'. That is to say, the processor 230 may determine whether the number of the commands queued in the command queue 220 is greater than the first threshold value, and may check the command queue 220 for an urgent command when the number of commands is greater than the first threshold value.

An urgent command may mean a command which has a possibility of a timeout to occur. In other words, each of the commands received from the host device has timeout time information, and the processor 230 may control the nonvolatile memory device 100 based on the timeout time information of the queued commands such that the respective commands may be processed within their specified timeout times.

The processor 230 may check and process an urgent command by checking the command queue 220 each time the predetermined command queue checkpoint is reached, such that a command having a relatively lower priority among the commands queued in the command queue 220 may be processed normally within a timeout time.

For example, when a command queue checkpoint is reached, the processor 230 may compute age difference values between the age of a command queued most recently in the command queue 220, that is, a command queued lastly, and the ages of the other commands, and may determine whether an age difference value greater than a predetermined threshold value (hereinafter, referred to as a 'second threshold value') exists among the computed difference values. If an age difference value greater than the second threshold value exists, the processor 230 may determine, as an urgent command, a command corresponding to the corresponding age difference value among the other commands except the command queued most recently, and process first the urgent command. The age of a command relates to the turn with which the command is received from the host device.

In the present embodiment, the processor 230 may variably control the first threshold value and the second threshold value depending on a situation, and thereby control a frequency of checking the command queue 220 and a frequency of checking and processing an urgent command.

Figure 2:
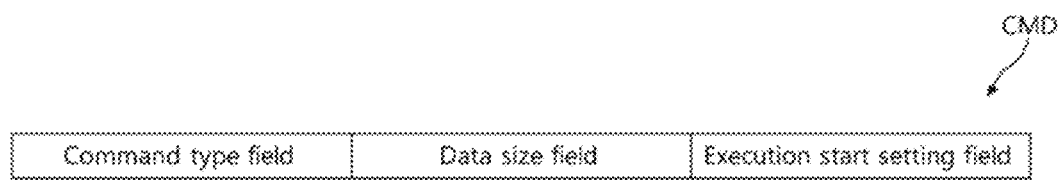
FIG. 2 is a diagram illustrating an example of a command received from a host device.

Each of the commands received from the host device may include a plurality of fields in which various information are stored. For example, as shown in FIG. 2, each command may include a command type field in which a command type information is stored, a data size field in which a data size information is stored, and an execution start setting field in which information on whether to start execution is stored. While it is illustrated in FIG. 2 that each command includes three fields, this is to only illustrate the fields associated with the present embodiment, for the sake of convenience in explanation, and it is to be noted that fields to be included in each command are not limited specifically thereto.

The command type information is information on whether a corresponding command is a read command or a write command, and the data size information is information on the size of data to read or the size of data to write. A method for the processor 230 to control the first threshold value and the second threshold value is as follows. In the present embodiment, the first threshold value may mean the number of the commands queued in the command queue 220 to determine a checkpoint of the command queue 220, and the second threshold value may mean an age difference value between the queued commands for selecting an urgent command among the commands queued in the command queue 220.

The processor 230 may sum data sizes for all the commands queued in the command queue 220, and compute a first weight based on the sum of data sizes. For example, the first weight may be proportional to the sum of data sizes. That is to say, the first weight may be increased as the sum of data sizes increases, and be decreased as the sum of data sizes decreases.

The processor 230 may sum data sizes for all the commands queued in the command queue 220 each time a command received from the host device is queued in the command queue 220, and thereby, compute the first weight.

Also, the processor 230 may compute a second weight based on the types of the respective commands queued in the command queue 220. For example, the processor 230 may apply the weights set in advance by the types of commands, to the respective commands queued in the command queue 220, and compute the second weight by summing the applied weights. For example, the weight of a command of which processing time is relatively long may be set to be relatively high, and the weight of a command of which processing time is relatively short may be set to be relatively low. The second weight may be increased as the rate of commands of which weights are set to be high, among the commands queued in the command queue 220, increases. In contrast, the second weight may be decreased as the rate of commands of which weights are set to be low, among the commands queued in the command queue 220, increases.

The processor 230 may sum weights by types for all the commands queued in the command queue 220 each time a command received from the host device is queued in the command queue 220, and thereby, compute the second weight.

In other words, the processor 230 may compute, in real time, the first weight and the second weight, and control, also in real time, the first threshold value and the second threshold value based on the first weight and the second weight computed in real time, respectively. As a result, a command queue checkpoint and an age difference value for selecting an urgent command may be controlled in real time.

Meanwhile, the processor 230 may control the first threshold value and the second threshold value based on not only the above-described first weight and second weight but also a dirty status value of the nonvolatile memory device 100. The "dirty status value" may mean a degree of fragmentation of valid pages in free blocks of the nonvolatile memory device 100. For example, as the degree of fragmentation increases, the dirty status value increases. Also, as the degree of fragmentation decreases, the dirty status value decreases.

A factor for computing the first weight, that is, the sum of data sizes by the commands queued in the command queue 220, a factor for computing the second weight, that is, the sum of weights by the types of the commands queued in the command queue 220, and the dirty status value of the nonvolatile memory device 100 may correspond to factors that exert influences on a latency.

Namely, as the sum of data sizes by the commands queued in the command queue 220 and the sum of weights by the types of the commands queued in the command queue 220 increase and the nonvolatile memory device 100 is dirty, a latency increases. The "latency" may mean that a time until the data storage device 10 provides a response for the command received from the host device to the host device is delayed. If a latency increases, the possibility of a command which stands by in the command queue 220 and has a low priority, not to be processed within its prescribed timeout may increase.

In general, since a command queue checkpoint and an age difference value for selecting an urgent command, that is, a first threshold value and a second threshold value, are respectively fixed, even in the case where a latency increases, an urgent command is not checked and processed until the fixed command queue checkpoint is reached. As a result, a situation in which an urgent command is not processed within a timeout may occur. Moreover, even in the case where a latency does not occur, a situation in which the command queue 220 is unnecessarily checked frequently may occur.

In order to cope with these problems, in the present embodiment, the processor 230 may actively control the first threshold value and the second threshold value based on the factors that exert influences on a latency. That is to say, the processor 230 may increase or decrease each of the first threshold value or the second threshold value based on latency increasing factors.

For example, if the first weight, the second weight and the dirty status value of the nonvolatile memory device 100 as factors that induce a latency increase, the processor 230 may advance a command queue checkpoint and decrease an age difference value for selecting an urgent command, by decreasing the first threshold value and the second threshold value. In this way, by advancing a command queue checkpoint and decreasing an age difference value, a frequency of checking the command queue 220 and a frequency of processing an urgent command may be increased. In other words, in a situation where an increase in latency is expected, the processor 230 may more frequently check the command queue 220 and process an urgent command in a timeout.

If the first weight, the second weight and the dirty status value of the nonvolatile memory device 100 as factors that induce a latency decrease, the processor 230 may defer a command queue checkpoint and increase an age difference value for selecting an urgent command, by increasing the first threshold value and the second threshold value. In this way, by deferring a command queue checkpoint and increasing an age difference value, a frequency of checking the command queue 220 and a frequency of processing an urgent command may be decreased. In other words, in a situation where a decrease in latency is expected, the processor 230 may not perform an unnecessary check operation for the command queue 220. While it was described in the present embodiment that the processor 230 controls the first threshold value and the second threshold value by considering all of the first weight, the second weight and the dirty status value of the nonvolatile memory device 100, it is to be noted that the embodiment is not limited specifically thereto, and the first threshold value and the second threshold value may be controlled based on at least one selected among the first weight, the second weight and the dirty status value of the nonvolatile memory device 100.

Figure 3:
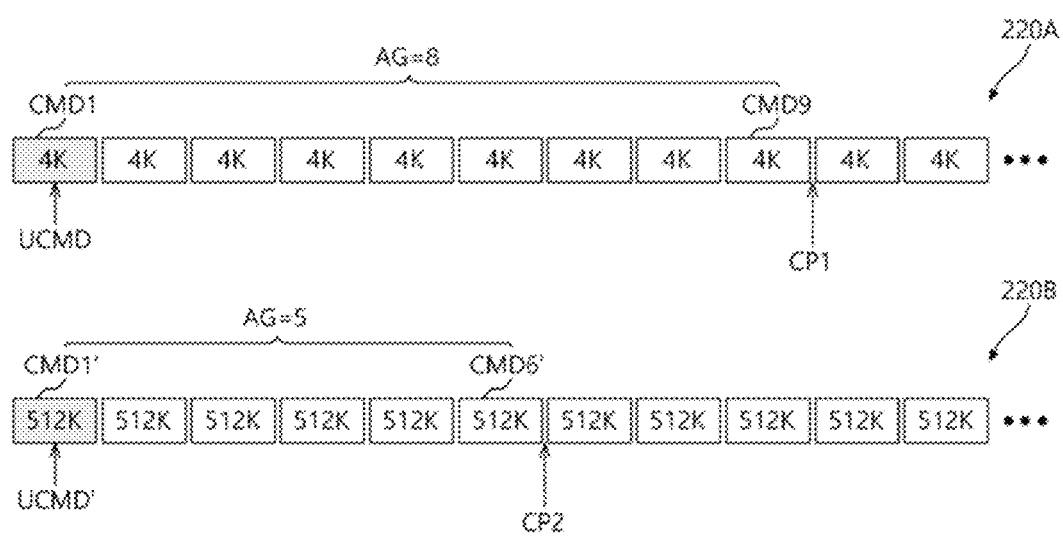
FIG. 3 is a diagram illustrating a command queue checkpoint that is changed depending on a data size by each the commands queued in a command queue, and an age difference value.

FIG. 3 is a diagram illustrating a command queue checkpoint that is changed depending on the sum of the data sizes by the commands queued in the command queue 220 of FIG. 1, and an age difference value. In FIG. 3, for the sake of convenience in explanation, a command queue in which commands having a small data size are queued is referred to as a first command queue 220A, and a command queue in which commands having a large data size are queued is referred to as a second command queue 220B. The first command queue 220A and the second command queue 220B are illustrated as an example to explain command queue checkpoints that are controlled depending on data sizes by commands and age difference values, and are not components which are configured separately.

Moreover, for the sake of convenience in explanation, it is assumed that, in the first command queue 220A and the second command queue 220B, first commands CMD1 and CDM1' are commands which have lowest priorities and are received earliest.

Referring to FIG. 3, a data size of each of the commands queued in the first command queue 220A is 4 KB, while a data size of each of the commands queued in the second command queue 220B is 512 KB. The processor 230 may cumulatively sum the data sizes of the commands each time a command is queued from when each of the first commands CMD1 and CDM1' is queued in each of the first command queue 220A and the second command queue 220B.

For example, if a ninth command CMD9 is queued in the first command queue 220A, the sum of data sizes of the commands queued in the first command queue 220A may be 36 KB. Similarly, if a sixth command CMD6' is queued in the second command queue 220B, the sum of data sizes of the commands queued in the second command queue 220B may be 3072 KB.

The processor 230 may allocate the first weight corresponding to the sum of data sizes 36 KB, to the first command queue 220A, and allocate the first weight corresponding to the sum of data sizes 3072 KB, to the second command queue 220B. Since the first weight is proportional to the size of the data size sum as described above, the first weight allocated to the second command queue 220B may be relatively larger than the first weight allocated to the first command queue 220A.

According to this fact, the processor 230 may increase the first threshold value and the second threshold value for the first command queue 220A to which the relatively small first weight is allocated, and decrease the first threshold value and the second threshold value for the second command queue 220B to which the relatively large first weight is allocated.

For example, in the case where the command queue 220 of FIG. 1 corresponds to the first command queue 220A, since an increase in latency is not expected, when the number of the commands queued in the command queue 220 is equal to or greater than the first threshold value, for example, "9," the processor 230 may check the command queue 220 according to a command queue checkpoint CP1. The processor 230 may compute age difference values between the command CMD9 queued most recently and the other commands, and determine and process the command CMD1 which has an age difference value equal to or greater than the second threshold value, for example, "8," among the computed age difference values, as an urgent command UCMD.

Moreover, in the case where the command queue 220 of FIG. 1 corresponds to the second command queue 220B, since an increase in latency is expected, when the number of the commands queued in the command queue 220 is equal to or greater than the first threshold value, for example, "6," the processor 230 may check the command queue 220 according to a command queue checkpoint CP2. The processor 230 may compute age difference values between the command CMD6' queued most recently and the other commands, and determine and process the command CMD1' which has an age difference value equal to or greater than the second threshold value, for example, "5," among the computed age difference values, as an urgent command UCMD'.

Namely, if an increase in latency is expected, the command queue 220 may be checked more frequently by advancing a command queue checkpoint and decreasing an age difference value, and an urgent command of which timeout will occur within a short time may be checked and be processed normally within the timeout.

Figure 4:
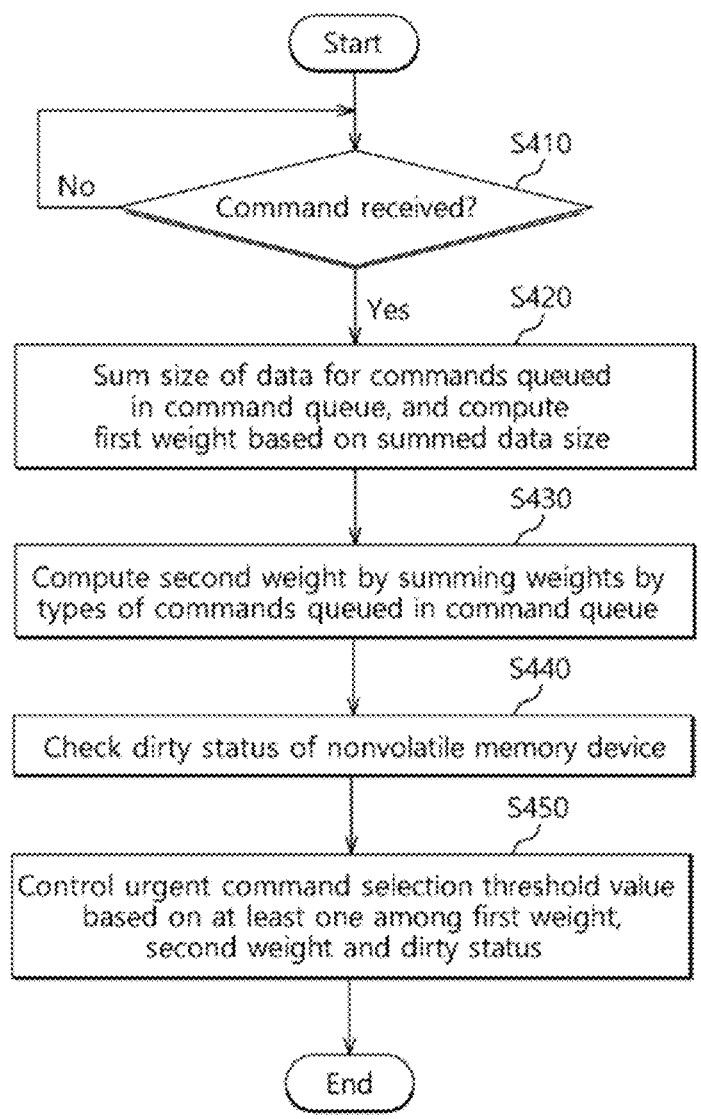
FIG. 4 is a flow chart illustrating a method for operating a data storage device including controlling an urgent command selection threshold value in accordance with an embodiment of the present disclosure.

FIG. 4 is a flow chart illustrating a method for operating a data storage device including controlling an urgent command selection threshold value in accordance with an embodiment. In explaining the method of FIG. 4, reference may be made to FIGS. 1 and 2.

Referring to FIG. 4, at step S410, the processor 230 may determine whether a command is received from the host device. If a command is received from the host device, step S420 may be performed.

At the step S420, the processor 230 may sum data sizes for all the commands queued in the command queue 220, and compute a first weight based on the sum of data sizes. For example, the first weight may be increased as the sum of data sizes increases, and be decreased as the sum of data sizes decreases.

At step S430, the processor 230 may compute a second weight by summing weights by the types of all the commands queued in the command queue 220.

At step S440, the processor 230 may check a dirty status for the nonvolatile memory device 100.

At step S450, the processor 230 may control an urgent command selection threshold value based on the first weight, the second weight and the dirty status for the nonvolatile memory device 100 obtained through the steps S420 to S440, respectively. The urgent command selection threshold value may be a threshold value for selecting an urgent command which has a high possibility of a timeout to occur, among the commands queued in the command queue 220.

The urgent command selection threshold value may include a first threshold value corresponding to the number of commands, for setting a command queue checkpoint, and a second threshold value corresponding to an age difference value, for selecting an urgent command.

At step S450, the processor 230 may control the urgent command selection threshold value by using at least one of the first weight, the second weight and the dirty status for the nonvolatile memory device 100. In an embodiment, the processor 230 may control the urgent command selection threshold value based on all of the first weight, the second weight and the dirty status for the nonvolatile memory device 100.

Figure 5:
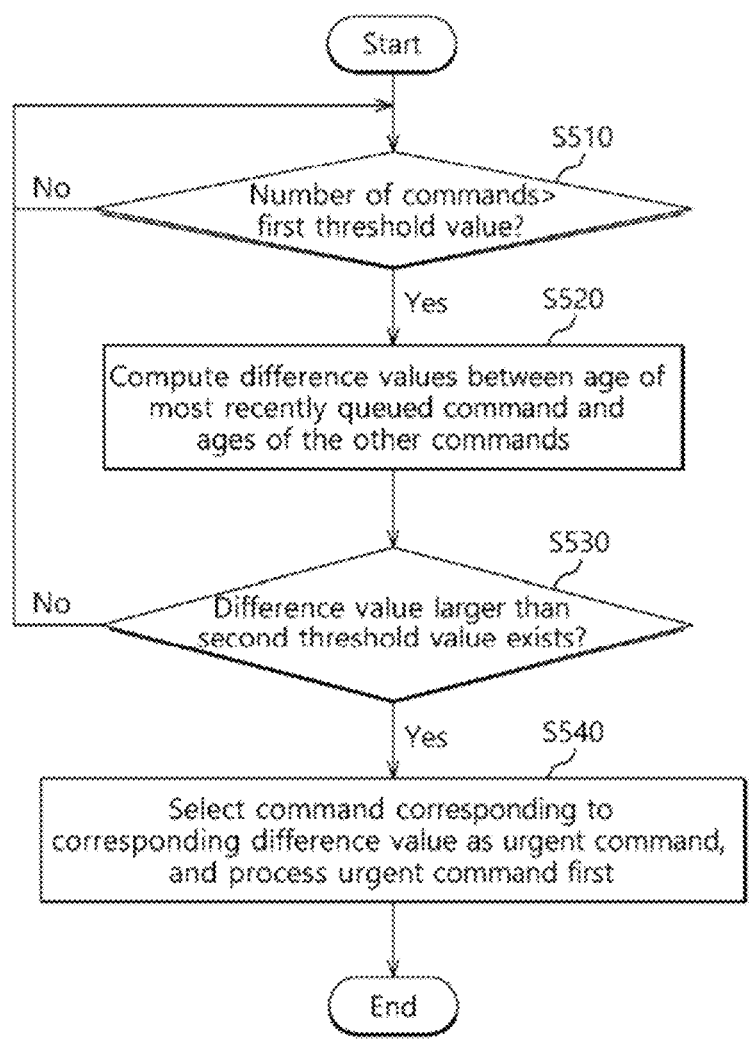
FIG. 5 is a flow chart illustrating a method for selecting an urgent command in a data storage device in accordance with an embodiment of the present disclosure.

FIG. 5 is a flow chart illustrating a method for selecting an urgent command in a data storage device in accordance with an embodiment. In explaining the method of FIG. 5, reference may be made to FIGS. 1 and 2.

Referring to FIG. 5, at step S510, the processor 230 may determine whether the number of the commands queued in the command queue 220 is larger or greater than a first threshold value. If the number of the commands queued in the command queue 220 is greater than the first threshold value, step S520 may be performed.

At the step S520, the processor 230 may compute difference values between the age of a command queued most recently in the command queue 220 and the ages of the other commands queued in the command queue 220.

At step S530, the processor 230 may determine whether a difference value greater than a second threshold value exists among the difference values computed through the step S520. If a difference value greater than the second threshold value exists, step S540 may be performed.

At the step S540, the processor 230 may select a command corresponding to the corresponding difference value, as an urgent command, and process first the selected urgent command regardless of a priority.

The first threshold value and the second threshold value used at the steps S510 and S530 may be ones that are controlled through the steps S420 to S450 of FIG. 4. That is to say, the first threshold value and the second threshold value used in the method for selecting an urgent command, depicted in FIG. 5, may be controlled in real time through the method for controlling an urgent command selection threshold value, depicted in FIG. 4.

Figure 6:
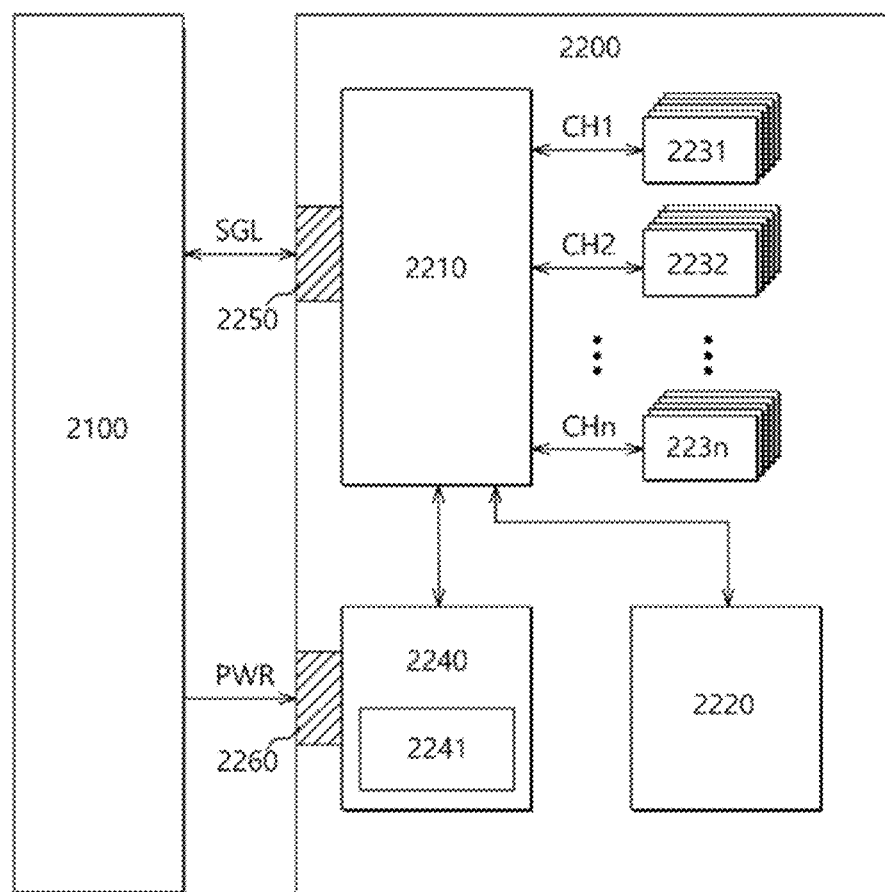
FIG. 6 is a diagram illustrating an example of a data processing system including a solid-state drive (SSD) according to an embodiment of the present disclosure.

FIG. 6 is a diagram illustrating an example of a data processing system 2000 including a solid-state drive (SSD) 2200 according to an embodiment of the present disclosure. Referring to FIG. 6, the data processing system 2000 may include a host device 2100 and the SSD 2200.

The SSD 2200 may include a controller 2210, a buffer memory device 2220, a plurality of nonvolatile memory devices 2231 to 223n, a power supply 2240, a signal connector 2250, and a power connector 2260.

The controller 2210 may control an overall operation of the SSD 2200.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn, respectively. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host device 2100 through the signal connector 2250. The signal SGL may include a command, an address, data, and the like. The signal connector 2250 may be configured of various types of connectors according to an interfacing method between the host device 2100 and the SSD 2200.

Figure 7:
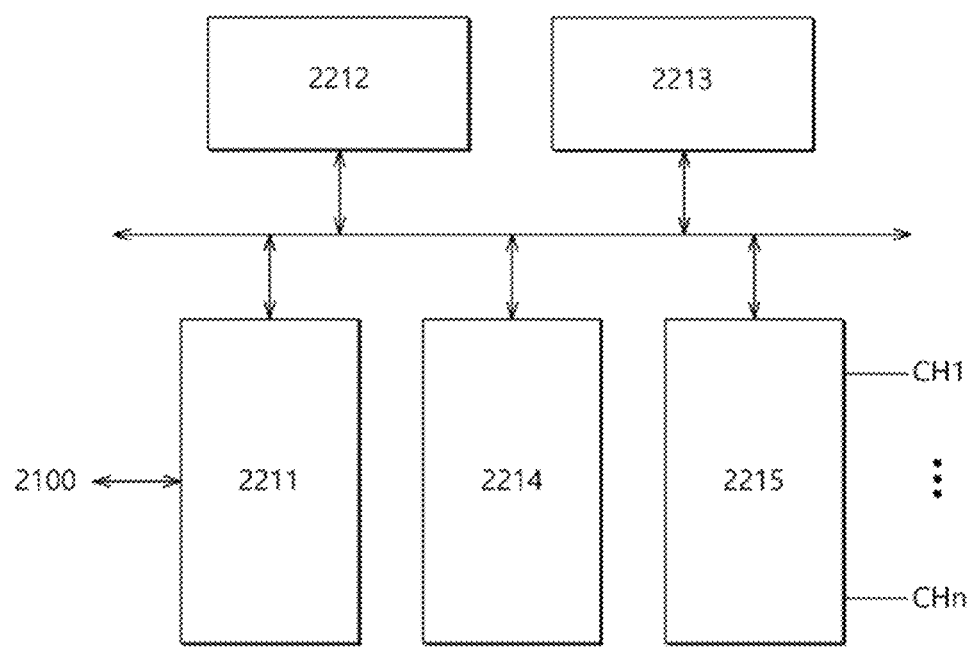
FIG. 7 is a diagram illustrating an example of a controller illustrated in FIG. 6.

FIG. 7 is a diagram illustrating an example of the controller 2210 of FIG. 6. Referring to FIG. 7, the controller 2210 may include a host interface unit 2211, a control unit 2212, a random-access memory (RAM) 2213, an error correction code (ECC) unit 2214, and a memory interface unit 2215.

The host interface unit 2211 may perform interfacing between the host device 2100 and the SSD 2200 according to a protocol of the host device 2100. For example, the host interface unit 2211 may communicate with the host device 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI express (PCI-e) protocol, and a universal flash storage (UFS) protocol. The host interface unit 2211 may perform a disc emulation function that the host device 2100 recognizes the SSD 2200 as a general-purpose data storage device, for example, a hard disc drive (HDD).

The control unit 2212 may analyze and process the signal SGL received from the host device 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to at least one of the nonvolatile memory devices 2231 to 223n. The generated parity data may be stored in the nonvolatile memory devices 2231 to 223n together with the data. The ECC unit 2214 may detect errors for data read from at least one of the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with at least one of the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 8:
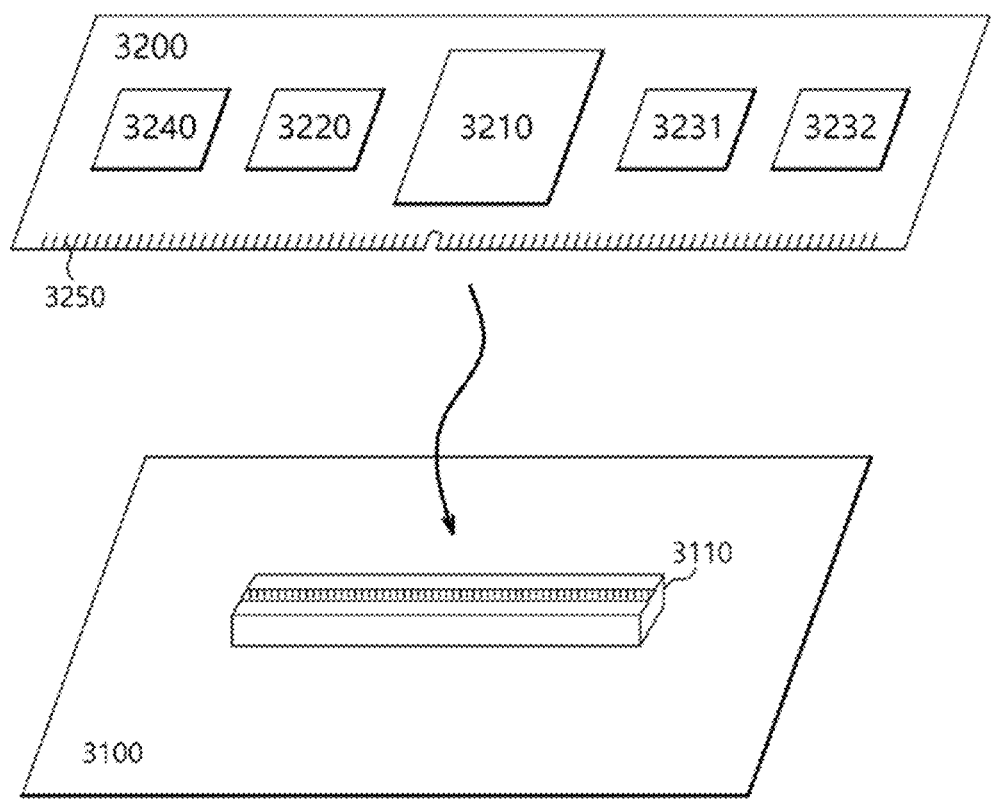
FIG. 8 is a diagram illustrating an example of a data processing system including a data storage device according to an embodiment of the present disclosure.

FIG. 8 is a diagram illustrating an example of a data processing system 3000 including a data storage device 3200 according to an embodiment of the present disclosure. Referring to FIG. 8, the data processing system 3000 may include a host device 3100 and the data storage device 3200.

The host device 3100 may be configured in a board form such as a printed circuit board (PCB). Although not shown in FIG. 8, the host device 3100 may include internal functional blocks configured to perform functions of the host device 3100.

The host device 3100 may include a connection terminal 3110 such as a socket, a slot, or a connector. The data storage device 3200 may be mounted on the connection terminal 3110.

The data storage device 3200 may be configured in a board form such as a PCB. The data storage device 3200 may refer to a memory module or a memory card. The data storage device 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage device 3200. The controller 3210 may be configured to have the same configuration as the controller 2210 illustrated in FIG. 7.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as a storage medium of the data storage device 3200.

The PMIC 3240 may provide power input through the connection terminal 3250 to the inside of the data storage device 3200. The PMIC 3240 may manage the power of the data storage device 3200 according to control of the controller 3210.

The connection terminal 3250 may be coupled to the connection terminal 3110 of the host device 3100. A signal such as a command, an address, and data and power may be transmitted and/or received between the host device 3100 and the data storage apparatus 3200 through the connection terminal 3250. The connection terminal 3250 may be configured in various forms according to an interfacing method between the host device 3100 and the data storage device 3200. The connection terminal 3250 may be arranged in any one side of the data storage device 3200.

Figure 9:
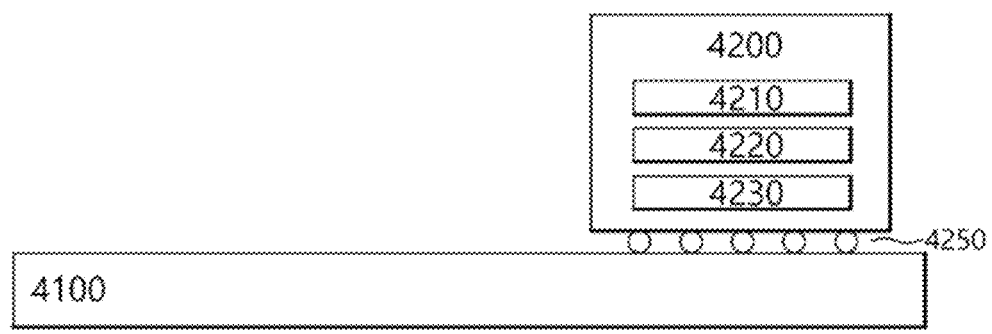
FIG. 9 is a diagram illustrating an example of a data processing system including a data storage device according to an embodiment of the present disclosure.

FIG. 9 is a diagram illustrating an example of a data processing system 4000 including a data storage device 4200 according to an embodiment of the present disclosure. Referring to FIG. 9, the data processing system 4000 may include a host device 4100 and a data storage device 4200.

The host device 4100 may be configured in a board form such as a printed circuit board (PCB). Although not shown in FIG. 9, the host device 4100 may include internal functional blocks configured to perform functions of the host device 4100.

The data storage device 4200 may be configured in a surface mounting packaging form. The data storage device 4200 may be mounted on the host device 4100 through a solder ball 4250. The data storage device 4200 may include a controller 4210, a buffer memory device 4220, and a nonvolatile memory device 4230.

The controller 4210 may control an overall operation of the data storage device 4200. The controller 4210 may be configured to have the same configuration as the controller 2210 illustrated in FIG. 7.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host device 4100 or the nonvolatile memory device 4230 through control of the controller 4210.

The nonvolatile memory device 4230 may be used as a storage medium of the data storage device 4200.

Figure 10:
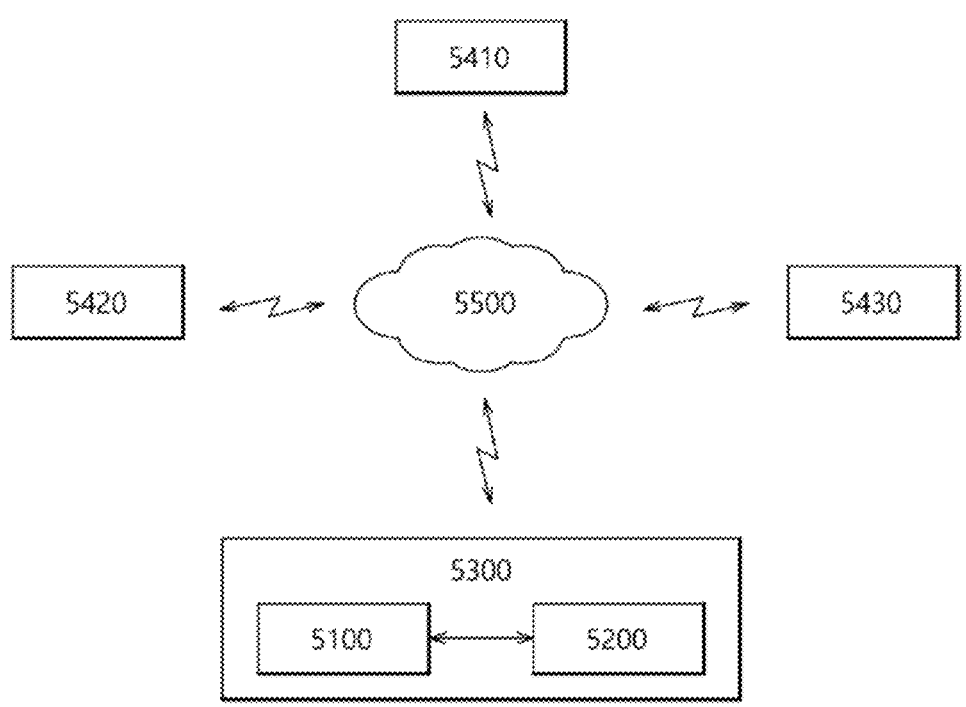
FIG. 10 is a diagram illustrating an example of a network system including a data storage device according to an embodiment of the present disclosure.

FIG. 10 is a diagram illustrating an example of a network system 5000 including a data storage device 5200 according to an embodiment of the present disclosure. Referring to FIG. 10, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host device 5100 and the data storage device 5200. The data storage device 5200 may be configured of the data storage device 10 of FIG. 1, the data storage device 2200 of FIG. 6, the data storage device 3200 of FIG. 8, or the data storage device 4200 of FIG. 9.

Figure 11:
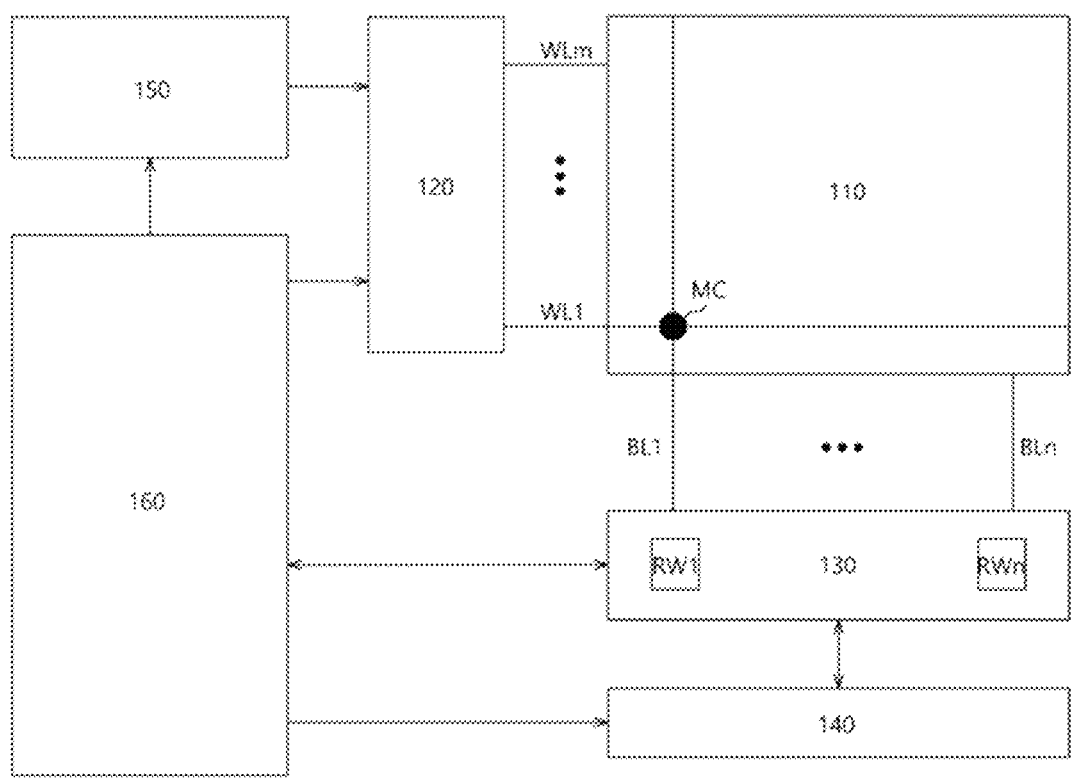
FIG. 11 is a diagram illustrating an example of a nonvolatile memory device included in a data storage device according to an embodiment of the present disclosure.

FIG. 11 is a diagram illustrating an example of a nonvolatile memory device 100 included in a data storage device according to an embodiment of the present disclosure. Referring to FIG. 11, the nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to one or more of the word lines WL1 to WLm based on the address decoding result The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate through control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been described above, it will be understood to those skilled in the art that the embodiments described are examples only. Accordingly, it is noted that the data storage device and the operating method described herein should not be limited based on the described embodiments, and that many other embodiments and variations thereof may be envisaged by those skilled in the art to which the present invention pertains without departing from the scope or spirit of the present invention as defined in the following claims.

What is claimed is:

1. A method for operating a data storage device, comprising:
   determining a first weight based on the sum of data sizes for commands queued in a command queue;
   determining a second weight by summing weights by types of the commands; and
   controlling an urgent command selection threshold value for selecting an urgent command existing in the command queue, based on at least one of the first weight and the second weight.

2. The method according to claim 1, further comprising, before the determining of the first weight,
   determining whether a command is received from a host device.

3. The method according to claim 1, further comprising:
   checking a dirty status for a nonvolatile memory device.

4. The method according to claim 1, wherein the urgent command selection threshold value comprises:
   a first threshold value for setting a point of time for selecting the urgent command; and
   a second threshold value for selecting the urgent command among the commands queued in the command queue.

5. The method according to claim 1, wherein the urgent command selection threshold value is inversely proportional to the first weight and the second weight.

6. The method according to claim 2, wherein the determining of the first weight is performed when a command is received from the host device.

7. The method according to claim 3, wherein the controlling of the urgent command selection threshold value is performed by using all of the first weight, the second weight and the dirty status for the nonvolatile memory device.

8. The method according to claim 3, wherein the controlling of the urgent command selection threshold value is performed by using at least one selected among the first weight, the second weight and the dirty status for the nonvolatile memory device.

9. The method according to claim 4, further comprising:
   determining whether the number of the commands queued in the command queue is greater than the first threshold value;
   computing difference values between an age of a command queued most recently in the command queue and ages of the other commands, when the number of the commands is greater than the first threshold value;
   determining whether a difference value greater than the second threshold value exists among computed difference values; and
   selecting and processing a command corresponding to a corresponding difference value, as the urgent command, when the difference value greater than the second threshold value exists.

10. A data storage device comprising:
    a nonvolatile memory device;
    a command queue suitable for queuing commands received from a host device; and
    a processor suitable for determining a first weight by summing data sizes for the commands queued in the command queue, determining a second weight by summing weights by types of the commands, and controlling an urgent command selection threshold value for selecting an urgent command existing in the command queue, based on at least one of the first weight and the second weight.

11. The data storage device according to claim 10, wherein the processor controls the urgent command selection threshold value based on a dirty status for the nonvolatile memory device.

12. The data storage device according to claim 10, wherein the urgent command selection threshold value comprises:
    a first threshold value for setting a point of time for selecting the urgent command; and
    a second threshold value for selecting the urgent command among the commands queued in the command queue.

13. The data storage device according to claim 11, wherein the processor controls the urgent command selection threshold value by using all of the first weight, the second weight and the dirty status for the nonvolatile memory device.

14. The data storage device according to claim 11, wherein the processor controls the urgent command selection threshold value by using at least one selected among the first weight, the second weight and the dirty status for the nonvolatile memory device.

15. The data storage device according to claim 12, wherein the processor determines whether the number of the commands queued in the command queue is greater than the first threshold value, and computes difference values between an age of a command queued most recently in the command queue and ages of the other commands, when the number of the commands is greater than the first threshold value.

16. The data storage device according to claim 15, wherein the processor determines whether a difference value greater than the second threshold value exists among computed difference values, and selects and processes a command corresponding to a corresponding difference value, as the urgent command, when a difference value greater than the second threshold value exists.

* * * * *